US008509582B2

(12) United States Patent
Selbrede (10) Patent No.: US 8,509,582 B2
(45) Date of Patent: Aug. 13, 2013

(54) REDUCING LIGHT LEAKAGE AND IMPROVING CONTRAST RATIO PERFORMANCE IN FTIR DISPLAY DEVICES

(75) Inventor: Martin G. Selbrede, The Woodlands, TX (US)

(73) Assignee: Rambus Delaware LLC, Brecksville, OH (US)

(*) Notice: Subject to any disclaimer, the term of this patent is extended or adjusted under 35 U.S.C. 154(b) by 1632 days.

(21) Appl. No.: 11/215,515

(22) Filed: Aug. 30, 2005

(65) Prior Publication Data

US 2007/0047887 A1  Mar. 1, 2007

(51) Int. Cl.
*G02B 6/10* (2006.01)

(52) U.S. Cl.
USPC ............................................. 385/129

(58) Field of Classification Search
USPC ........................................ 385/126; 362/610
See application file for complete search history.

(56) References Cited

U.S. PATENT DOCUMENTS

| | | | |
|---|---|---|---|
| 4,694,460 A | 9/1987 | Hayakawa et al. | |
| 4,830,447 A * | 5/1989 | Kamiyama et al. | 385/130 |
| 4,856,013 A | 8/1989 | Iwano et al. | |
| 4,896,331 A | 1/1990 | Hirata | |
| 4,904,037 A | 2/1990 | Imoto et al. | |
| 4,915,503 A | 4/1990 | Pavlath | |
| 4,937,836 A | 6/1990 | Yamamoto et al. | |
| 4,976,513 A | 12/1990 | Numai | |
| 5,016,960 A | 5/1991 | Eichen et al. | |
| 5,039,190 A | 8/1991 | Blonder et al. | |
| 5,047,213 A | 9/1991 | Finlan et al. | |
| 5,111,519 A | 5/1992 | Mathis | |
| 5,195,161 A | 3/1993 | Adar et al. | |
| 5,259,046 A | 11/1993 | DiGiovanni et al. | |
| 5,457,760 A | 10/1995 | Mizrahi | |
| 5,459,799 A | 10/1995 | Weber | |
| 5,526,371 A | 6/1996 | Shmulovich et al. | |
| 5,623,566 A | 4/1997 | Lee et al. | |
| 5,684,907 A * | 11/1997 | Sprehn et al. | 385/123 |
| 5,712,937 A | 1/1998 | Asawa et al. | |
| 5,764,826 A | 6/1998 | Kuhara et al. | |

(Continued)

FOREIGN PATENT DOCUMENTS

WO  WO 03073405 A2 *  9/2003

OTHER PUBLICATIONS

Skutnik, Bolesh and Trumbull, MR, High Strength, unbuffered optical fibers, 1998, Journal of Non-Crystalline Solids, 239, pp. 210 and 217.*

*Primary Examiner* — Uyen Chau N Le
*Assistant Examiner* — John M Bedtelyon
(74) *Attorney, Agent, or Firm* — Renner, Otto, Boisselle & Sklar, LLP (57) ABSTRACT

An optical noise reduction mechanism for reducing undesired frustration of total internal reflected light. Such optical noise may stem from defects in waveguide construction. Such optical noise may also stem from the difference in refractive index between any cladding layers disposed onto the planar waveguide and the refractive index of the medium (e.g., air) between the light sources and the light insertion surface of the planar waveguide. By interposing a material of appropriate refractive index, either as a thin layer onto the light insertion surface of the waveguide or filling the space between the waveguide and the light source, the planar waveguide becomes more tolerant of geometry errors and cladding layer properties because a safe operating area is established between the unadjusted critical angle of the system and the actual range of ray angles allowed admittance into the waveguide.

49 Claims, 4 Drawing Sheets

(56) References Cited

U.S. PATENT DOCUMENTS

| | | | |
|---|---|---|---|
| 5,822,473 A | 10/1998 | Magel et al. | |
| 5,832,163 A | 11/1998 | Hollister | |
| 5,999,307 A | 12/1999 | Whitehead et al. | |
| 6,018,533 A | 1/2000 | Krivoshlykov | |
| 6,175,671 B1 | 1/2001 | Roberts | |
| 6,185,346 B1 | 2/2001 | Asawa et al. | |
| 6,236,669 B1 | 5/2001 | Nakanishi et al. | |
| 6,253,015 B1 | 6/2001 | Ukrainczyk | |
| 6,304,711 B1 | 10/2001 | Samson et al. | |
| 6,307,663 B1 | 10/2001 | Kowarz | 359/231 |
| 6,317,443 B1 | 11/2001 | Craig et al. | |
| 6,496,636 B1 | 12/2002 | Braiman et al. | |
| 6,522,433 B2 | 2/2003 | Kelsey et al. | |
| 6,597,721 B1 | 7/2003 | Hutchinson et al. | |
| 6,650,822 B1 * | 11/2003 | Zhou | 385/147 |
| 6,676,284 B1 * | 1/2004 | Wynne Willson | 362/555 |
| 6,684,007 B2 | 1/2004 | Yoshimura et al. | |
| 6,690,845 B1 | 2/2004 | Yoshimura et al. | |
| 6,700,697 B2 | 3/2004 | Nikolajsen et al. | |
| 6,706,546 B2 | 3/2004 | Yoshimura et al. | |
| 6,757,463 B2 | 6/2004 | Hutchinson et al. | |
| 6,768,824 B2 | 7/2004 | Ramachandran | |
| 6,785,447 B2 | 8/2004 | Yoshimura et al. | |
| 6,795,232 B2 | 9/2004 | Fujiura et al. | |
| 6,836,578 B2 | 12/2004 | Kochergin et al. | |
| 6,842,544 B2 | 1/2005 | Eldada | |
| 6,858,864 B2 | 2/2005 | Atanackovic et al. | |
| 6,865,018 B2 | 3/2005 | Frolov et al. | |
| 6,875,561 B2 | 4/2005 | Leu et al. | |
| 6,876,490 B2 | 4/2005 | Kane et al. | |
| 6,879,386 B2 | 4/2005 | Shurgalin et al. | |
| 6,891,998 B2 | 5/2005 | Jones | |
| 6,909,538 B2 | 6/2005 | Arbore et al. | |
| 6,944,192 B2 | 9/2005 | Prassas et al. | |
| 6,946,238 B2 * | 9/2005 | Zhang et al. | 430/321 |
| 6,947,621 B2 | 9/2005 | Bell, Jr. et al. | |
| 6,950,597 B2 | 9/2005 | Chen et al. | |
| 6,961,502 B1 | 11/2005 | Wysocki et al. | |
| 6,970,654 B1 | 11/2005 | Paglione et al. | |
| 7,003,186 B2 | 2/2006 | Bell, Jr. et al. | |
| 7,006,744 B2 | 2/2006 | Carniel et al. | |
| 7,023,011 B2 | 4/2006 | Atanackovic et al. | |
| 7,024,092 B2 | 4/2006 | Englund et al. | |
| 7,046,879 B2 | 5/2006 | Kapusta et al. | |
| 7,061,610 B2 | 6/2006 | Mittelstein et al. | |
| 7,065,265 B2 | 6/2006 | Hammer | |
| 7,110,632 B2 | 9/2006 | Abeles | |
| 7,123,796 B2 * | 10/2006 | Steckl et al. | 385/40 |
| 7,163,331 B2 * | 1/2007 | Suzuki et al. | 362/610 |
| 2004/0001665 A1 * | 1/2004 | Zoorob | 385/16 |
| 2005/0036728 A1 * | 2/2005 | Braunisch | 385/14 |
| 2006/0042322 A1 * | 3/2006 | Mendoza et al. | 65/386 |

* cited by examiner

REDUCING LIGHT LEAKAGE AND IMPROVING CONTRAST RATIO PERFORMANCE IN FTIR DISPLAY DEVICES

TECHNICAL FIELD

The present invention relates in general to the field of flat panel displays, and more particularly to reducing the light leakage and improving contrast ratio performance in frustrated total internal reflection (FTIR) display devices.

BACKGROUND INFORMATION

Flat panel displays and other devices that exploit the principle of frustrated total internal reflection (FTIR) to induce the emission of light from the system may have to satisfy crucial physical criteria to function properly. The display system disclosed in U.S. Pat. No. 5,319,491, which is incorporated by reference in its entirety herein, as representative of a larger class of FTIR-based devices, illustrates the fundamental principles at play within an FTIR-based device. Such a device is able to selectively frustrate the light undergoing total internal reflection within a (generally) planar waveguide. When such frustration occurs, the region of frustration constitutes a pixel suited to external control. A rectangular array of such regions, which are often controlled by electrical/electronic means, is fabricated upon the top active surface of the planar waveguide. This aggregate structure, when suitably configured, functions as a video display capable of color generation usually by exploiting field sequential color and pulse width modulation techniques.

The criteria to be satisfied for FTIR systems to function properly involve two fundamental areas: the preconditions for frustration, and the preconditions for non-frustration. There are many mechanisms available to frustrate total internal reflection (five of which are articulated in U.S. Pat. No. 5,319,491), all of which lead to a pixel being in an "on state" (emitting light through the "window" dynamically created in the planar waveguide). At issue is the physical configuration to secure a suitable "off state" where light is intended to remain within the planar waveguide across a given pixel region.

The off state (quiescent, inactive state) of individual pixels on a display, and indeed of the display in general, is of the highest importance. If some light is always leaking (by spurious emission, frustration, or other cause) from the display (at the pixels, between the pixels, or in general), this constitutes system noise that compromises the quality of the signal. The contrast ratio of a display is based on its signal-to-noise ratio, and contrast ratio serves as a primary index of display quality and accuracy. Therefore, if an FTIR display emits noise (light when and where no light is supposed to be emitted), this harms the display's quality.

Noise arises when total internal reflection is frustrated when and where it should not be. Different causes can give rise to such system noise, and in most displays more than one cause is operative to add to the noise level. For example, the optical quality of the material selected for the planar waveguide has a direct bearing on noise. If the material has many scattering domains distributed through it (so that it becomes more translucent than transparent), some of the light scattered off these domains will be scattered at angles that do not conserve total internal reflection. For this reason, the waveguide will glow in proportion to the amount of scattering domains distributed within it, thereby raising the noise floor. The solution to this problem is to fabricate the waveguide from the most optically transmissive materials available, thereby securing a meaningful reduction of the noise floor with respect to this specific source of system noise.

Other noise sources within FTIR systems do not have so straightforward a solution route. The first involves errors in waveguide geometry (the limits of parallelism and orthogonality), while the second involves noise at the interface of the waveguide and any superadded cladding layers (which can serve to support various required pixel control mechanisms, protect the display surface from external trauma, and/or other purposes). These are sources of system noise (light leakage) that do not have a straightforward solution route.

Therefore, there is a need in the art for a means to reduce light leakage (system noise), and thus improve contrast ratio performance, in FTIR display devices where the leakage is due to geometric imperfections in waveguide fabrication and/or leakage at the interface of the waveguide to superadded cladding structures.

SUMMARY

The problems outlined above may at least in part be solved by interposing material with a tuned refractive index between the light insertion face of the planar waveguide and the light sources that illuminate the waveguide. The interposition of this layer subtly restricts the admissible range of angles entering the planar waveguide. As a result of this restriction, the system becomes more tolerant of errors in geometry. Furthermore, noise generated at the interface of the planar waveguide with any superadded cladding layers can be reduced or eliminated, to the extent the interposed material approaches, matches, or exceeds the refractive index of the cladding material itself. The tuning of the interposed material's refractive index is optimized by simultaneously maximizing system noise reduction and maximizing the angular range of light that is allowed to enter the waveguide.

In one embodiment of the present invention, an FTIR device comprises a rectangular solid planar waveguide composed of transparent, optically transmissive material, one of the four smaller surfaces of which is designated the insertion surface while one of the two large surfaces is designated the display surface where light emission via FTIR is effected. Further, the waveguide may have mirrored surfaces on up to three of the smaller surfaces other than the insertion surface, whether metallic or dielectric in nature. The FTIR device may further comprise one or more light sources (which may or may not be dynamically controllable as to color and cycle frequency), where such light source(s) is/are spaced apart in relation to the insertion surface of the planar waveguide, such that light is directed into the planar waveguide through the insertion face, typically with an air gap or other light coupling means between waveguide insertion face and light source(s). Further, light from the light sources can only enter the planar waveguide at angles where the Fresnel insertion loss is not total, i.e., at TIR-compliant angles. The FTIR device may further comprise one or more TIR frustration mechanisms distributed upon the display surface, the simplest example of which is an elastic polymer membrane with a refractive index close to that of the waveguide which can be mechanically propelled, via controllable electric switching, into and out of contact with the waveguide, such that contact (or near contact) frustrates TIR and causes light within the waveguide to pass into the membrane and (depending on local geometries optimized for optical emission angle) out to the viewer. The TIR-frustrating mechanism(s) may further comprise a stand-off system that keeps, for example, the afore-mentioned elastic polymer in spaced-apart relation to the waveguide in the off-state, until it is electrically actuated and propelled into contact or near-contact with the waveguide. Further, this stand-off system comprises an optical cladding layer, configured with a lower (perhaps significantly lower) refractive index than either the waveguide or the TIR frustration mechanism (e.g., elastic polymer membrane being dynamically deformed into and out of contact with the waveguide). The waveguide may exhibit errors in geometric construction (errors in parallelism between the three sets of opposing surfaces, and errors in orthogonality at all surfaces at a putative 90 degrees separation one from the other). The interface between the cladding (stand-off system) and the waveguide may itself be subject to mild frustration of TIR because the refractive index of the cladding is greater than that of the refractive index of the air between the light sources and the waveguide insertion face, said mismatch meaning the critical angle for TIR is lower than expected at the display surface. Geometric error and mismatch in refractive index between the cladding and waveguide are sources of system noise, both of which can be reduced by a mechanism for TIR noise reduction. This system for TIR noise reduction may comprise a transparent material of refractive index equal to or slightly greater than the refractive index of the cladding layer. Further, this transparent material is interposed between the insertion face of the waveguide and the light source(s), such that the angular range of light admitted in the waveguide is sufficiently restricted to compensate for geometric errors in waveguide construction as well as for the fact that the cladding's refractive index is greater than that of air. This interposed, refractive-index-tuned interlayer may either be a simple layer added to the insertion face (with light sources still disposed in the air), or may also completely encapsulate both the insertion face and the light sources so that at no point does light emitted from the light sources travel in air, due to the embedding of the light sources within this interposed material. The addition of this noise reduction mechanism improves the contrast ratio and signal-to-noise ratio of the composite system by reducing noise caused by undesired (parasitic) frustration of TIR.

The foregoing has outlined rather broadly the features and technical advantages of one or more embodiments of the present invention in order that the detailed description of embodiments of the present invention that follows may be better understood. Additional features and advantages of embodiments of the present invention will be described hereinafter which form the subject of the claims.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, components have been shown in generalized form in order not to obscure the present invention in unnecessary detail. For the most part, details considering considerations of controlled selective dynamic frustration of total internal reflection (i.e., actual pixel operation) and the like have been omitted inasmuch as such details are not necessary to obtain a complete understanding of the present invention and, while within the skills of persons of ordinary skill in the relevant art, are not directly relevant to the utility and value provided by the present invention.

The principles of operation to be disclosed immediately below assume the presence of at least one of the two deleterious noise sources that can arise within frustrated total internal reflection (FTIR) devices that can be suitably mitigated by deploying the present invention. These noise sources are undesired TIR frustration due to errors in parallelism and orthogonality in the fabrication of the waveguide, and undesired TIR frustration due to the difference in refractive index between any cladding (stand-off mechanisms) disposed directly on the waveguide display surface (usually higher than 1.0) and the refractive index of air (nominally 1.0).

Among the technologies (flat panel display or other candidate technologies that exploit the principle of frustrated total internal reflection) that lend themselves to implementation of the present invention is the flat panel display disclosed in U.S. Pat. No. 5,319,491, which is hereby incorporated herein by reference in its entirety. The use of a representative flat panel display example throughout this detailed description shall not be construed to limit the applicability of the present invention to that field of use, but is intended for illustrative purposes as touching the matter of deployment of the present invention.

Figure 3:
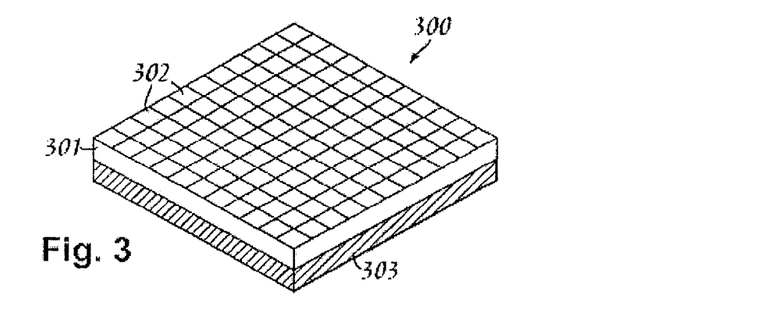
FIG. 3 illustrates a perspective view of a flat panel display in accordance with an embodiment of the present invention.

Such a representative flat panel display may comprise a matrix of optical shutters commonly referred to as pixels or picture elements as illustrated in FIG. 3. FIG. 3 illustrates a simplified depiction of a flat panel display 300 comprised of a light guidance substrate 301 which may further comprise a flat panel matrix of pixels 302. Behind the light guidance substrate 301 and in a parallel relationship with substrate 301 may be a transparent (e.g., glass, plastic, etc.) substrate 303. It is noted that flat panel display 300 may comprise other elements than illustrated such as a light source, an opaque throat, an opaque backing layer, a reflector, and tubular lamps, as disclosed in U.S. Pat. No. 5,319,491.

Figure 4A:
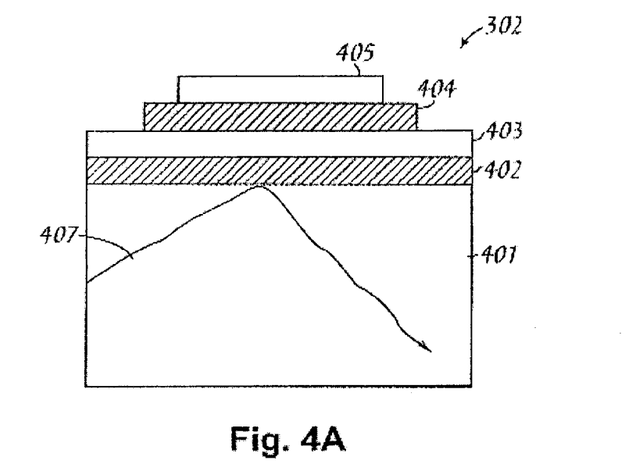
FIG. 4A illustrates a side view of a pixel in a deactivated state in accordance with an embodiment of the present invention.
Figure 4B:
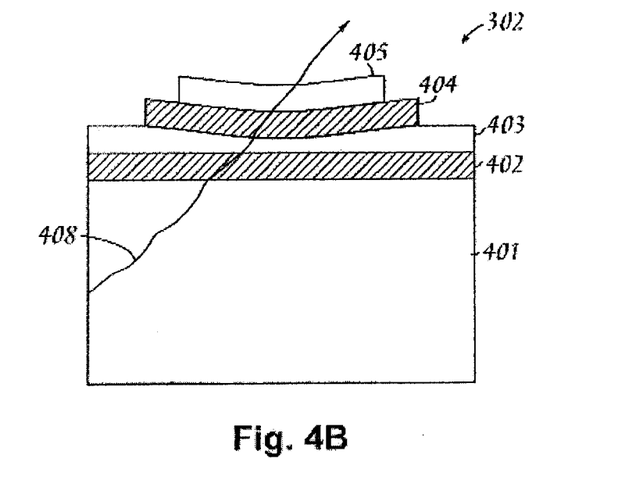
FIG. 4B illustrates a side view of a pixel in an activated state in accordance with an embodiment of the present invention.

Each pixel 302, as illustrated in FIGS. 4A and 4B, may comprise a light guidance substrate 401, a ground plane 402, a deformable elastomer layer 403, and a transparent electrode 404.

Pixel 302 may further comprise a transparent element shown for convenience of description as disk 405 (but not limited to a disk shape), disposed on the top surface of electrode 404, and formed of high-refractive index material, preferably the same material as comprises light guidance substrate 401.

In this particular embodiment, it is necessary that the distance between light guidance substrate 401 and disk 405 be controlled very accurately. In particular, it has been found that in the quiescent state, the distance between light guidance substrate 401 and disk 405 should be approximately 1.5 times the wavelength of the guided light, but in any event this distance is greater than one wavelength. Thus the relative thicknesses of ground plane 402, deformable elastomer layer 403, and electrode 404 are adjusted accordingly. In the active state, disk 405 is pulled by capacitive action, as discussed below, to a distance of less than one wavelength from the top surface of light guidance substrate 401.

In operation, pixel 302 exploits an evanescent coupling effect, whereby TIR (Total Internal Reflection) is violated at pixel 302 by modifying the geometry of deformable elastomer layer 403 such that, under the capacitative attraction effect, a concavity 406 results (which can be seen in FIG. 4B). This resulting concavity 406 brings disk 405 within the limit of the light guidance substrate's evanescent field (generally extending outward from the light guidance substrate 401 up to one wavelength in distance). The electromagnetic wave nature of light causes the light to "jump" the intervening low-refractive-index cladding, i.e., deformable elastomer layer 403, across to the coupling disk 405 attached to the electrostatically-actuated dynamic concavity 406, thus defeating the guidance condition and TIR. Light ray 407 (shown in FIG. 4A) indicates the quiescent, light guiding state. Light ray 408 (shown in FIG. 4B) indicates the active state wherein light is coupled out of light guidance substrate 401.

The distance between electrode 404 and ground plane 402 may be extremely small, e.g., 1 micrometer, and occupied by deformable layer 403 such as a thin deposition of room temperature vulcanizing silicone. While the voltage is small, the electric field between the parallel plates of the capacitor (in effect, electrode 404 and ground plane 402 form a parallel plate capacitor) is high enough to impose a deforming force on the vulcanizing silicone thereby deforming elastomer layer 403 as illustrated in FIG. 4B. By compressing the vulcanizing silicone to an appropriate fraction, light that is guided within guided substrate 401 will strike the deformation at an angle of incidence greater than the critical angle for the refractive indices present and will couple light out of the substrate 401 through electrode 404 and disk 405.

The electric field between the parallel plates of the capacitor may be controlled by the charging and discharging of the capacitor which effectively causes the attraction between electrode 404 and ground plane 402. By charging the capacitor, the strength of the electrostatic forces between the plates increases thereby deforming elastomer layer 403 to couple light out of the substrate 401 through electrode 404 and disk 405 as illustrated in FIG. 4B. By discharging the capacitor, elastomer layer 403 returns to its original geometric shape thereby ceasing the coupling of light out of light guidance substrate 401 as illustrated in FIG. 4A.

As stated in the Background Information section, certain devices that exploit the principle of frustrated total internal reflection lend themselves to contrast ratio enhancement using the present invention, whereby undesired frustration of total internal reflection (whether pixels are in the activated or quiescent state) is significantly attenuated. A pertinent example that will be used throughout this disclosure to illustrate the operative principles in question is shown in FIG. 1 in exploded view, and in FIG. 2 in assembled view.

It should be understood that this optical example, proceeding from U.S. Pat. No. 5,319,491, is provided for illustrative purposes as a member of a class of valid candidate applications and implementations, and that any device, comprised of any system exploiting the principle of frustrated total internal reflection, can be enhanced with respect to signal-to-noise ratio, contrast ratio, and parasitic system noise where such noise is due to geometry errors in waveguide fabrication or refractive index mismatch between the cladding layer and air. The present invention governs a mechanism for noise reduction for a large family of devices that meet certain specific operational criteria regarding the implementation of FTIR principles, while the specific reduction to practice of any particular device being so enhanced imposes no restriction on the ability of the present invention to reduce optical noise within the device.

Figure 1:
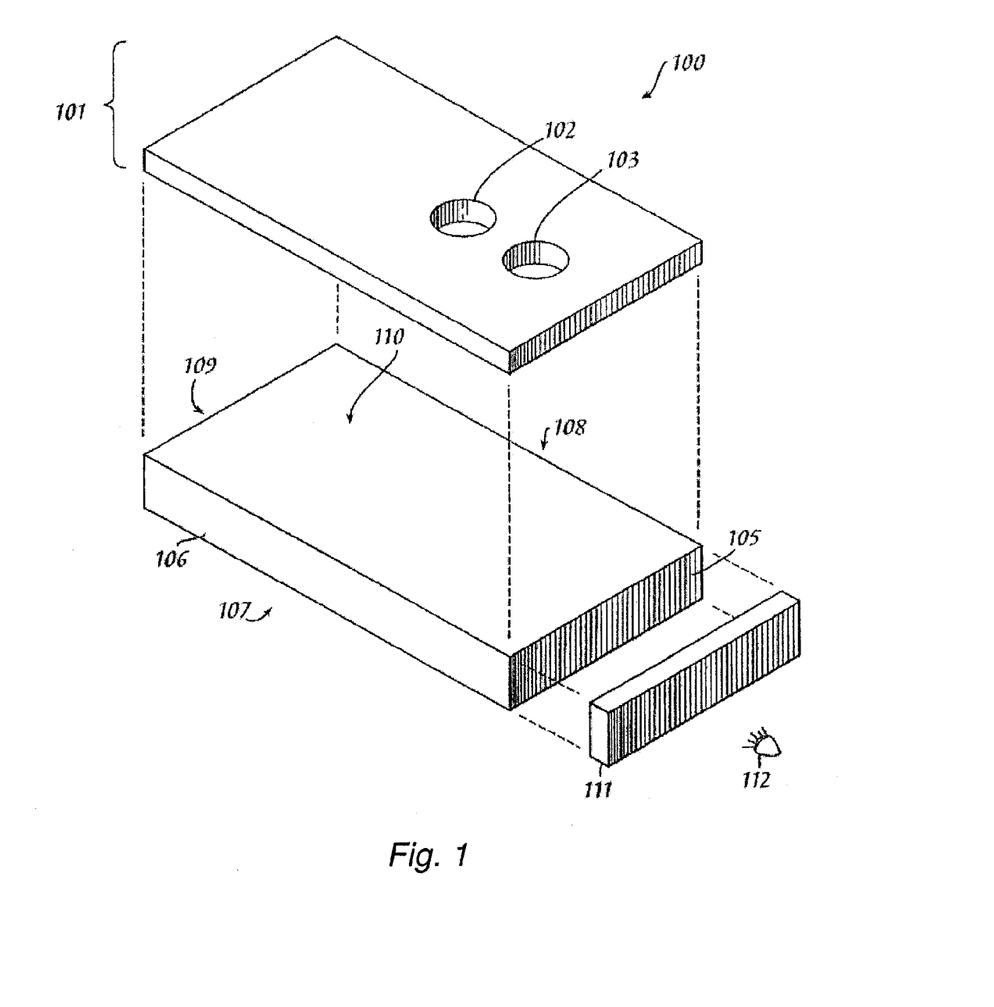
FIG. 1 illustrates an embodiment of the present invention of an exploded view of a noise reduction mechanism.
Figure 2A:
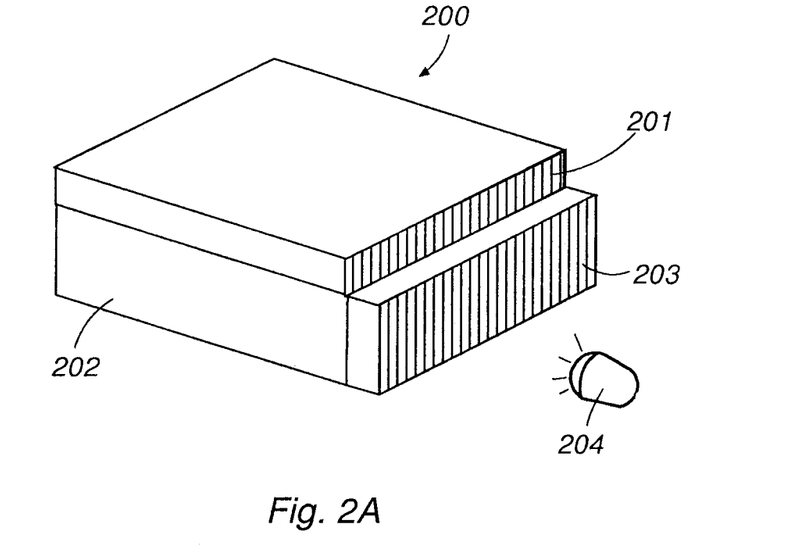
FIG. 2A illustrates an embodiment of the present invention of an assembled view of the noise reduction mechanism.
Figure 2B:
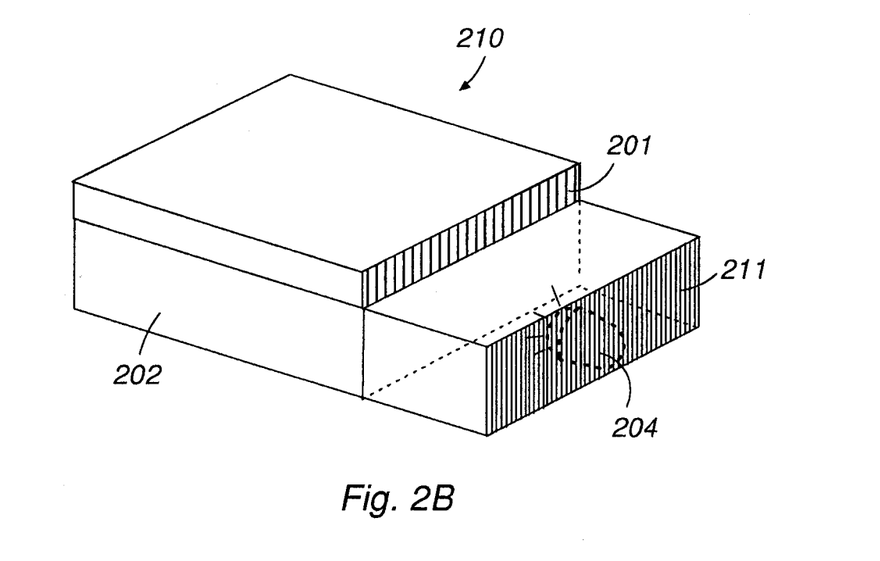
FIG. 2B illustrates another embodiment of the present invention of an assembled view of the noise reduction mechanism.

FIG. 1 depicts, in exploded view, an embodiment of the present invention of a noise reduction mechanism 100. Mechanism 100 includes a planar waveguide, 104, which, being a rectangular solid, necessarily has six sides. Waveguide 104 has two large sides designated as 110 and 107. Waveguide 104 further includes two opposing pairs of remaining sides, 109 and 105, and 106 and 108. Side 108 is referred to herein as the "display surface." Side 105 is referred to herein as the "light insertion surface." A light source 112 is situated in spaced-apart relation to the light insertion surface 105, such that light emitted from light source 112 will be incident upon side 105. The light incident upon side 105 will obey the Fresnel laws concerning reflection and refraction as a function of incidence angle and the respective refractive indices of the material comprising planar waveguide 104 and the medium (presumably air) between light source 112 and the light insertion face 105. Planar waveguide 104 corresponds in principle to light guidance substrate 401 in FIGS. 4A-B, excepting that the level of detail (individual identification of the component's six surfaces, etc.) is made more explicit in FIG. 1.

A thin cladding layer 101 is deposited on planar waveguide 104. The material comprising cladding layer 101 has a significantly lower refractive index than planar waveguide 104. In one embodiment, cladding layer 101 includes sol-gel. In another embodiment, cladding layer 101 includes aerogel. Cladding layer 101 generally corresponds in principle to cladding layer 403 of FIGS. 4A-B. Cladding layer 101 may also be configured to include voids, such as represented by cavities 102 and 103, thereby constituting the cladding layer a standoff region serving to keep other layers superadded on top of cladding 101 at a fixed distance from planar waveguide 104, but allowing sufficient degrees of freedom for the layers to move freely (via deformation or other mechanical/geometrical alteration) toward planar waveguide 104. It should be noted that the size, quantity, and distribution of such voids is a function of the intended purpose of the device the present invention is to be deployed upon. For flat panel display applications, such voids would be arranged in a rectangular array centered on each putative pixel region, and the number of such voids can easily exceed one million. Therefore, the voids (holes) in cladding layer 102 and 103 are representative for a far larger class of modifications to the geometry of cladding layer 101 to cause it to satisfy other requirements (e.g., electromechanical standoff functionality, etc.).

Although the refractive index of cladding layer 101 may be significantly lower than that of planar waveguide 104, it is not likely to equal the refractive index of the medium (presumably air) through which light travels from light source 112 toward light insertion face 105. Consequently, by Snell's law, the angular range of light rays inserted into planar waveguide 104 exceeds by a small amount the angular range of light rays that satisfy the conditions for containment within the planar waveguide by the laws of total internal reflection. This result is obtained because total internal reflection is a function of the ratio of refractive indices across a boundary interface between two different materials, and the refractive index ratio of air to planar waveguide 104 does not match the refractive index ratio of cladding layer 101 to planar waveguide 104.

Consequently, the contact plane between waveguide 104 and cladding layer 101 will evidence a small but detectible amount of frustrated total internal reflection, excepting in regions where the cladding material is not in actual contact with the planar waveguide by virtue of imposed voids (such as the holes represented at 102 and 103). This effect raises the system noise floor.

Furthermore, errors in parallelism between the opposing pairs of surfaces comprising planar waveguide 104 can also give rise to unintended and undesired frustration of total internal reflection. Fabrication errors that cause surfaces 105 and 109, and/or surfaces 107 and 108, and/or surfaces 110 and 107, not to be parallel with one another, entails a change in incidence angle that accumulates with each internal reflection of light rays traveling inside planar waveguide 104. This cumulative error will ultimately place rays beyond the threshold for total internal reflection to occur. At that point, non-compliant rays that fail the Snell's law criterion for total internal reflection will contribute to the system noise floor. This same issue arises with respect to orthogonality: if the four smaller surfaces 105, 109, 108 and 106 are not each and severally perpendicular to the plane of the large surfaces 110 and 107, light rays traveling inside planar waveguide 104 will likewise exhibit accumulating error after each reflection event, which can lead to unintended frustration of total internal reflection and thus raise the system noise floor.

The present invention deploys an additional component, the purpose of which is to slightly restrict the angular range of light being inserted into planar waveguide 104. This angular restriction provides a "safe operating area," an intrinsic tolerance, to the system. The need for just such a safe operating area is easy to illustrate. For example, if the critical angle (based on Snell's law) for a given planar waveguide were 42 degrees, light from the light source 112 would enter planar waveguide 104 through light insertion face 105 at a range of angles between 0 and 42 degrees. If errors in parallelism or orthogonality caused some of the rays to stray 2 degrees prior to eventual exploitation (propagation through an opened pixel) or depletion (e.g., by scattering or degradation to thermal energy), then rays between 42 and 44 degrees will arise within planar waveguide 104 and will depart the system as unwanted noise. Furthermore, the critical angle is not 42 degrees at the contact plane between the cladding 101 and planar waveguide 104: it might be a lower value, like 40 degrees, because the cladding's refractive index will be higher than that of air. Therefore, light rays between 40 and 42 degrees (or 44 degrees, if parallelism errors be simultaneously present) will leave planar waveguide 104 as noise due to unintended frustration of total internal reflection.

On the other hand, if it were possible to restrict incoming light by a small angular amount, the perturbations caused by geometry errors and differential refractive index ratios can be safely accommodated. For instance, if the light entering planar waveguide 104 were restricted to 38 degrees, which is 4 degrees less than the 42 degree critical angle described above, the system could tolerate the light rays straying up to 2 degrees due to geometry errors (the range would rise from 38 degrees to 40 degrees) and would simultaneously tolerate the shifted critical angle at the boundary between planar waveguide 104 and cladding layer 101 (which, in the example above, is a 2 degree shift from 42 degrees to 40 degrees). This adjustment of the angular range of inserted light, then, would be sufficient to remove noise from both of these potential contributing factors. Light inside planar waveguide 104 will not undergo undesired frustrated total internal reflection due to either of these effects, if the insertion angles are properly restricted. Therefore, only desired frustration of total internal reflection (contingent upon pixel actuation, which is beyond the scope of the present invention to explicate) will occur. The present invention, as disclosed earlier, does not attenuate noise due to planar waveguide 104 material falling short of 100% transmissivity. To the extent waveguide 104 scatters light traveling within it, due to intrinsic properties of its constituent material, waveguide 104 will be "noisy." This particular noise source can only be attenuated using better grade materials, higher refractive index materials, or opaque masking being situated around the pixels in such a way as absorb noise but not otherwise perturb light within guide 104 traveling at TIR-conserving angles. Note that noise can also arise due to excessively high surface roughness of waveguide's 104 surfaces, the most straightforward remedy for which is improved manufacturing quality control.

A component that is important to the present invention is the addition of a material of suitable refractive index between light insertion face 105 and light source 112. This material makes intimate contact with light insertion face 105. One embodiment of such a structure can be a thin layer added to light insertion face 105, as represented by structure 111 in FIG. 1. In this embodiment, the gap between light insertion surface 105 and light source 112 is filled with the material of a suitable refractive index. The refractive index of the material that comprises 111 (whether construed as a plane of material bonded or otherwise in intimate contact with surface 105, or a larger mass of material extending from surface 105 and encapsulating light source 112) is selected to optimize noise reduction based on the actual tolerance required in the system to achieve desired results. If geometric errors are not a significant noise source, one can select the refractive index of material 111 to be equal to that of cladding 101. To provide additional immunity to noise, the refractive index of 111 can be chosen slightly higher than that of cladding 101. If errors in parallelism and orthogonality are anticipated, noise can be reduced by choosing a correspondingly higher value for the refractive index of material 111. In one embodiment, material 111 includes sol-gel. In another embodiment, material 111 includes aerogel.

While FIG. 1 illustrates key components in exploded view fashion, FIG. 2A illustrates an embodiment of the present invention of a noise reduction mechanism 200 (minus such voids within the cladding, like 102 and 103 in FIG. 1) in an assembled state. Mechanism 200 includes cladding layer 201 which corresponds to cladding layer 101 (FIG. 1). Mechanism 200 further includes planar waveguide 202 which corresponds to the entire planar waveguide 104 (FIG. 1). Mechanism 200 further includes a light source 204 which corresponds to light source 112 (FIG. 1). Mechanism 200 further includes tolerance-enhancing material (noise reduction layer) 203 which corresponds to the tolerance-enhancing material 111 (FIG. 1). Light emitted from lamp 204 passes through noise reduction layer 203 before entering planar waveguide 202. This trajectory through noise reduction layer 203 restricts the range of admissible angles entering waveguide 202, where the maximum admitted ray angle is less than the critical angle for total internal reflection within planar waveguide 202. Where the refractive index of noise reduction layer 203 is properly selected, this angular restriction provides intrinsic system immunity to noise caused by errors in parallelism and orthogonality in waveguide 202, as well as undesired frustration of total internal reflection at the interface between waveguide 202 and cladding layer 201. In no case should the refractive index of noise reduction layer 203 be less than that of cladding layer 201. The extent to which it may exceed the value is dependent on the degree of anticipated geometric error in fabricating a perfect rectangular solid 202, and the extent to which engineering concerns mandate the introduction of additional safe operating area. Note that there are penalties for choosing the refractive index of noise reduction layer 203 too high, since most planar waveguides benefit from maximizing the angular range of light rays traveling within them. It is therefore appropriate to adjust the refractive index of noise reduction layer 203 so that it is only as large as needed to secure meaningful noise reduction, without otherwise harming system operation. FIG. 2B illustrates noise reduction mechanism 210 where a noise reduction layer 211 extends from an edge surface of planar waveguide 202 an amount sufficient to enclose at least the emitter portion of lamp 204.

Figure 5:
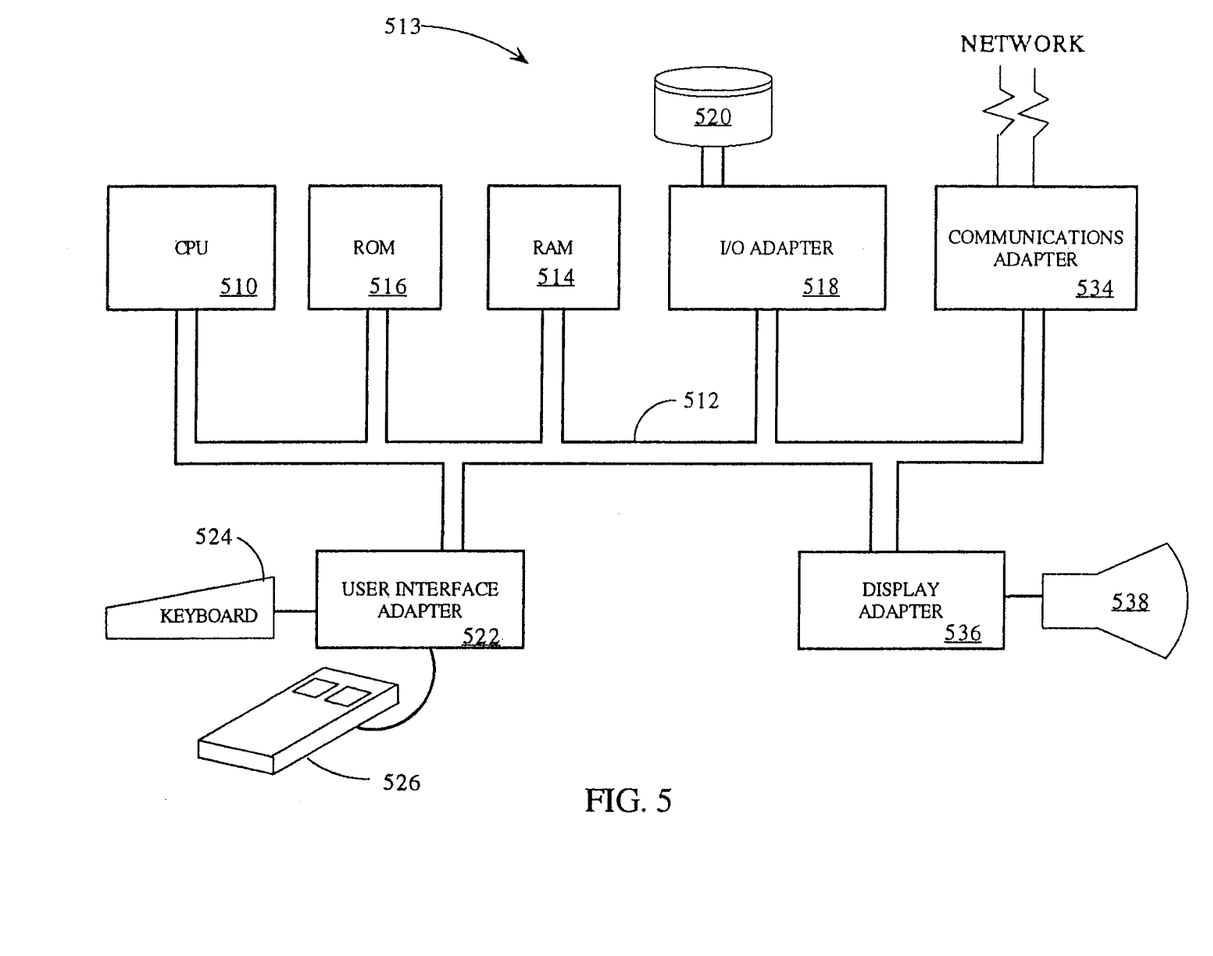
FIG. 5 illustrates a data processing system in accordance with an embodiment of the present invention.

A representative hardware environment for practicing the present invention is depicted in FIG. 5, which illustrates an exemplary hardware configuration of data processing system 513 in accordance with the subject invention having central processing unit (CPU) 510, such as a conventional microprocessor, and a number of other units interconnected via system bus 512. Data processing system 513 includes random access memory (RAM) 514, read only memory (ROM) 516, and a disk adapter 518 for connecting peripheral devices such as disk unit 520 to bus 512, user interface adapter 522 for connecting keyboard 524, mouse 526, and/or other user interface devices such as a touch screen device (not shown) to bus 512, communication adapter 534 for connecting data processing system 513 to a data processing network, and display adapter 536 for connecting bus 512 to display device 538. Display device 538 may implement any of the embodiments described herein. Any of the displays described herein may include pixels such as shown in FIGS. 4A and 4B. CPU 510 may include other circuitry not shown herein, which will include circuitry commonly found within a microprocessor, e.g., execution unit, bus interface unit, arithmetic logic unit, etc. CPU 510 may also reside on a single integrated circuit.

The invention claimed is:

1. A noise reduction mechanism comprising:
a planar waveguide having a top surface, a bottom surface, and four edge surfaces, wherein each of said four edge surfaces are perpendicular to both said top surface and said bottom surface;
a cladding layer disposed onto said top surface; and
a light source separated from at least one of said four edge surfaces by a noise reduction layer, wherein said noise reduction layer contacts said at least one of said four edge surfaces, and wherein a material of said noise reduction layer has a refractive index selected to optimize noise reduction.

2. The noise reduction mechanism as recited in claim 1, wherein said cladding layer comprises sol-gel.

3. The noise reduction mechanism as recited in claim 1, wherein said cladding layer comprises aerogel.

4. The noise reduction mechanism as recited in claim 1, wherein said refractive index of said noise reduction layer matches a refractive index of said cladding layer.

5. The noise reduction mechanism as recited in claim 4, wherein said noise reduction layer comprises aerogel.

6. The noise reduction mechanism as recited in claim 4, wherein said noise reduction layer comprises sol-gel.

7. The noise reduction mechanism as recited in claim 1, wherein said refractive index of said noise reduction layer exceeds a refractive index of said cladding layer.

8. The noise reduction mechanism as recited in claim 7, wherein said noise reduction layer comprises aerogel.

9. The noise reduction mechanism recited in claim 7, wherein said noise reduction layer comprises sol-gel.

10. The noise reduction mechanism recited in claim 1, wherein said noise reduction layer extends from said at least one of said four edge surfaces to said light source and encapsulates said light source such that a light emitted from said light source follows a trajectory that is wholly embedded within said material as said light passes from said light source into said planar waveguide.

11. The noise reduction mechanism as recited in claim 1, wherein said cladding layer includes a plurality of voids, wherein areas of said cladding layer without voids are used to keep other layers superadded on top of said cladding layer at a fixed distance from said planar waveguide.

12. The noise reduction mechanism as recited in claim 11, wherein said plurality of voids allow a degree of motional freedom to said superadded layers to move towards and away from said planar waveguide.

13. The noise reduction mechanism as recited in claim 1, wherein said refractive index of said noise reduction layer is not equal to a refractive index of said planar waveguide.

14. The noise reduction mechanism as recited in claim 1, wherein said light source is physically separate from said noise reduction layer.

15. The noise reduction mechanism as recited in claim 1, wherein the light source is configured to provide light at a range of angles, and wherein said refractive index of said material of said noise reduction layer is selected to optimize noise reduction by restricting the range of angles that enter the planar waveguide to angles less than a critical angle for total internal reflection within the planar waveguide.

16. A display system, comprising:
a planar waveguide having a top surface, a bottom surface, and four edge surfaces, wherein each of said four edge surfaces are perpendicular to both said top surface and said bottom surface;
a plurality of pixels on said waveguide, wherein said plurality of pixels comprises a cladding layer disposed onto said top surface; and
a light source separated from at least one of said four edge surfaces by a noise reduction layer, wherein said noise reduction layer contacts said at least one of said four edge surfaces, and wherein a material of said noise reduction layer has a refractive index selected to optimize noise reduction.

17. The display system as recited in claim 16, wherein said cladding layer comprises sol-gel.

18. The display system as recited in claim 16, wherein said cladding layer comprises aerogel.

19. The display system as recited in claim 16, wherein said refractive index of said noise reduction layer matches a refractive index of said cladding layer.

20. The display system as recited in claim 19 wherein said noise reduction layer comprises aerogel.

21. The display system as recited in claim 19, wherein said noise reduction layer comprises sol-gel.

22. The display system as recited in claim 16, wherein said refractive index of said noise reduction layer exceeds a refractive index of said cladding layer.

23. The display system as recited in claim 22, wherein said noise reduction layer comprises aerogel.

24. The display system as recited in claim 22, wherein said noise reduction layer comprises sol-gel.

25. The display system as recited in claim 16, wherein said noise reduction layer extends from said at least one of said four edge surfaces to said light source and encapsulates said light source such that a light emitted from said light source follows a trajectory that is wholly embedded within said material as said light passes from said light source into said planar waveguide.

26. The display system as recited in claim 16, wherein said cladding layer includes a plurality of voids, wherein areas of said cladding layer without voids are used to keep other layers superadded on top of said cladding layer at a fixed distance from said planar waveguide.

27. The display system as recited in claim 26, wherein areas of said plurality of voids allow a degree of motional freedom to said superadded layers to move towards and away from said planar waveguide.

28. The display system as recited in claim 13, wherein said refractive index of said noise reduction layer is not equal to a refractive index of said planar waveguide.

29. The display system as recited in claim 16, wherein the light source is configured to provide light at a range of angles, and wherein said refractive index of said material of said noise reduction layer is selected to optimize noise reduction by restricting the range of angles that enter the planar waveguide to angles less than a critical angle for total internal reflection within the planar waveguide.

30. A noise reduction mechanism comprising:
    a planar waveguide having a top surface, a bottom surface, and four edge surfaces, wherein each of said four edge surfaces are perpendicular to both said top surface and said bottom surface;
    a cladding layer disposed onto said top surface; and
    a light source separated from at least one of said four edge surfaces by a noise reduction layer, wherein said noise reduction layer contacts said at least one of said four edge surfaces, and wherein a material of said noise reduction layer has a refractive index equal to or greater than a refractive index of said cladding layer.

31. The noise reduction mechanism as recited in claim 30, wherein said cladding layer comprises sol-gel.

32. The noise reduction mechanism as recited in claim 30, wherein said refractive index of said noise reduction layer matches a refractive index of said cladding layer.

33. The noise reduction mechanism as recited in claim 32, wherein said noise reduction layer comprises sol-gel.

34. The noise reduction mechanism as recited in claim 30, wherein said refractive index of said noise reduction layer exceeds a refractive index of said cladding layer.

35. The noise reduction mechanism as recited in claim 34, wherein said noise reduction layer comprises sol-gel.

36. The noise reduction mechanism as recited in claim 30, wherein said noise reduction layer extends from said at least one of said four edge surfaces to said light source and encapsulates said light source such that a light emitted from said light source follows a trajectory that is wholly embedded within said material as said light passes from said light source into said planar waveguide.

37. The noise reduction mechanism as recited in claim 30, wherein said cladding layer includes a plurality of voids, wherein areas of said cladding layer without voids are used to keep other layers superadded on top of said cladding layer at a fixed distance from said planar waveguide.

38. The noise reduction mechanism as recited in claim 37, wherein said plurality of voids allow a degree of motional freedom to said superadded layers to move towards and away from said planar waveguide.

39. The noise reduction mechanism as recited in claim 30, wherein said planar waveguide has no more external surfaces than said top surface, bottom surface, and four edge surfaces.

40. A display system, comprising:
    a planar waveguide having a top surface, a bottom surface, and four edge surfaces, wherein each of said four edge surfaces are perpendicular to both said top surface and said bottom surface;
    a plurality of pixels on said waveguide, wherein said plurality of pixels comprises a cladding layer disposed onto said top surface; and
    a light source separated from at least one of said four edge surfaces by a noise reduction layer, wherein said noise reduction layer contacts said at least one of said four edge surfaces, and wherein a material of said noise reduction layer has a refractive index equal to or greater than a refractive index of said cladding layer.

41. The display system as recited in claim 40, wherein said cladding layer comprises sol-gel.

42. The display system as recited in claim 40, wherein said refractive index of said noise reduction layer matches a refractive index of said cladding layer.

43. The display system as recited in claim 42, wherein said noise reduction layer comprises sol-gel.

44. The display system as recited in claim 40, wherein said refractive index of said noise reduction layer exceeds a refractive index of said cladding layer.

45. The display system as recited in claim 44, wherein said noise reduction layer comprises sol-gel.

46. The display system as recited in claim 40, wherein said noise reduction layer extends from said at least one of said four edge surfaces to said light source and encapsulates said light source such that a light emitted from said light source follows a trajectory that is wholly embedded within said material as said light passes from said light source into said planar waveguide.

47. The display system as recited in claim 40, wherein said cladding layer includes a plurality of voids, wherein areas of said cladding layer without voids are used to keep other layers superadded on top of said cladding layer at a fixed distance from said planar waveguide.

48. The display system as recited in claim 47, wherein said plurality of voids allow a degree of motional freedom to said superadded layers to move towards and away from said planar waveguide.

49. The display system as recited in claim 40 wherein said light source is physically separate from said noise reduction layer.

* * * * *